Dec. 8, 1959 G. H. MULLER 2,916,296
FLUID PRESSURE SUSPENSION FOR MOTOR VEHICLES
Filed March 7, 1956 3 Sheets-Sheet 3
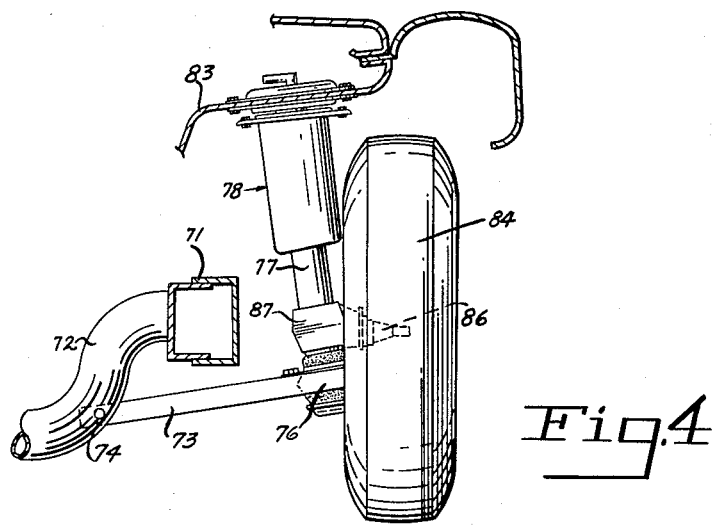
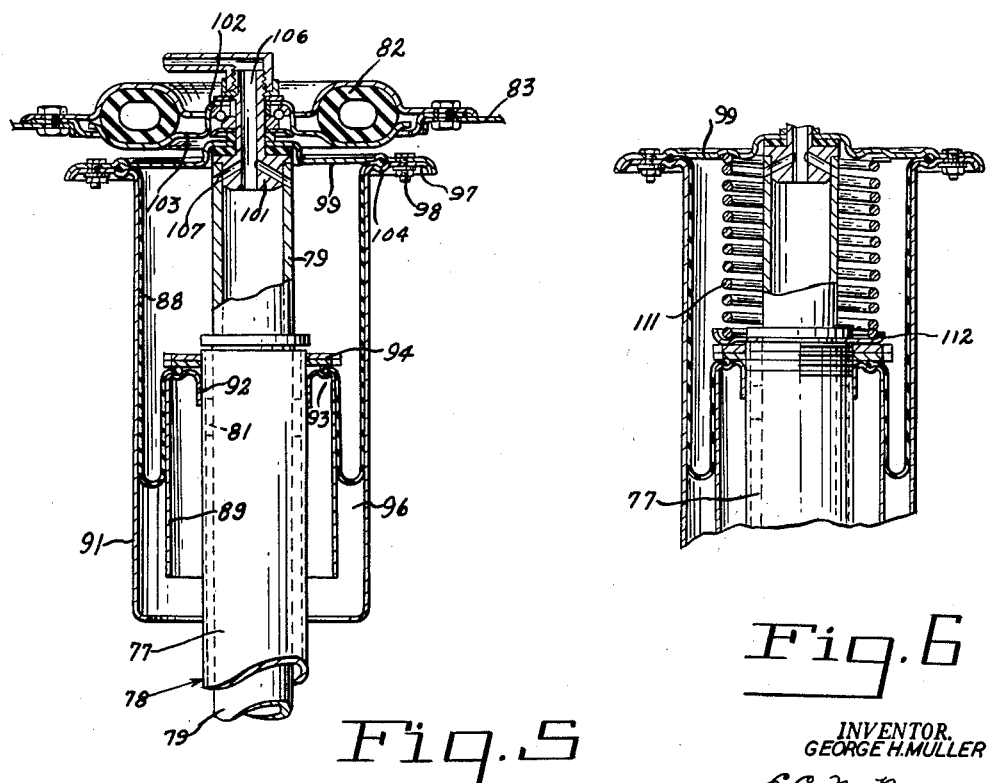
INVENTOR.
GEORGE H. MULLER
BY E.C. McRae
J.R. Faulkner
T.H. Oster
ATTYS.

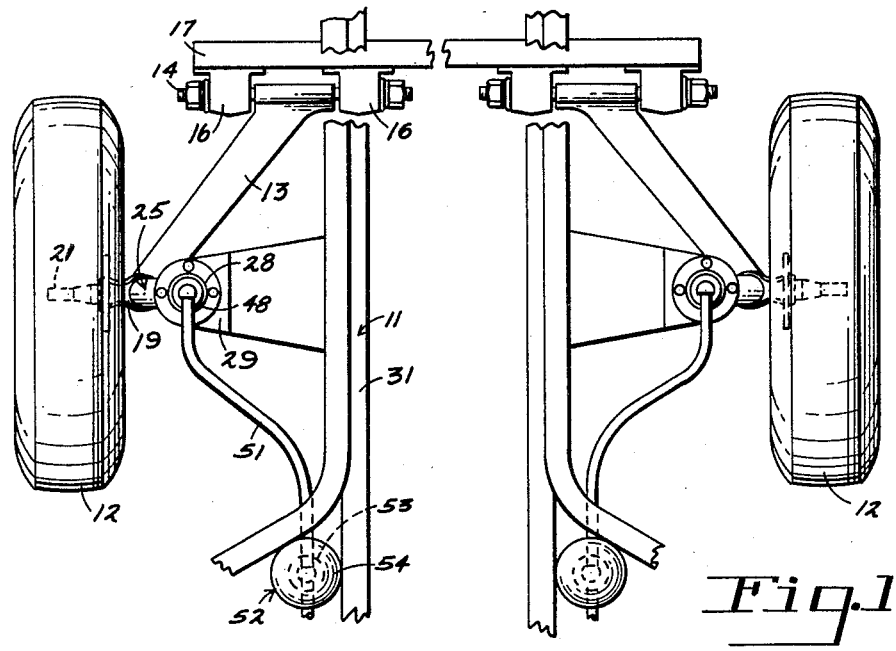
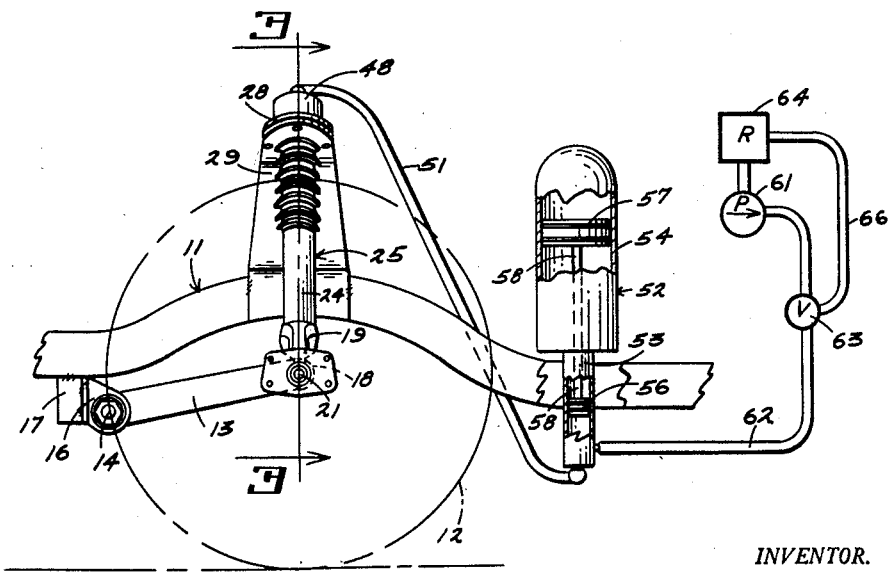

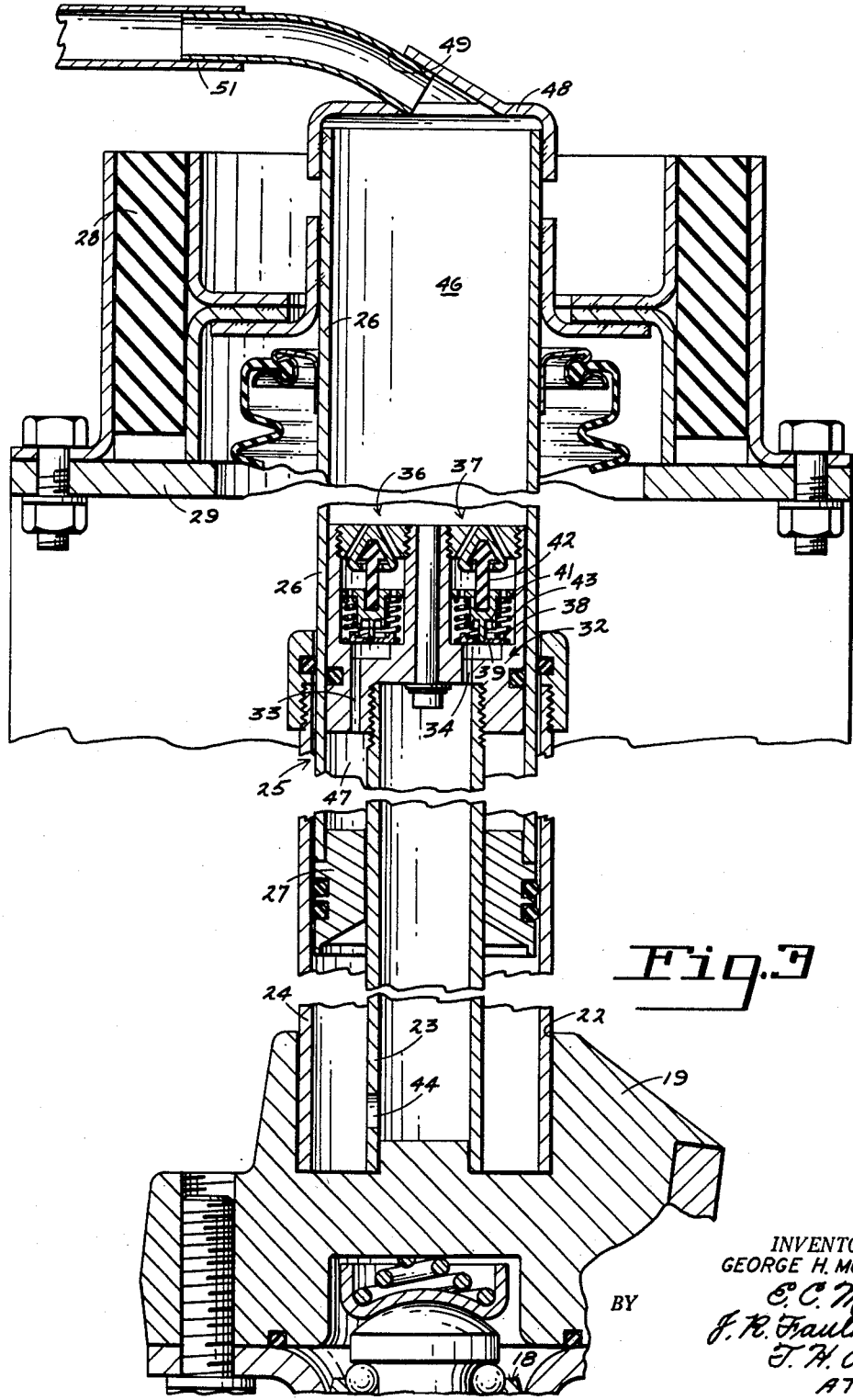

United States Patent Office
2,916,296
Patented Dec. 8, 1959

2,916,296

FLUID PRESSURE SUSPENSION FOR MOTOR VEHICLES

George H. Muller, Northville, Mich., assignor to Ford Motor Company, Dearborn, Mich., a corporation of Delaware Application March 7, 1956, Serial No. 570,045

6 Claims. (Cl. 280—124)

This invention relates generally to motor vehicles, and particularly to an independent wheel suspension for a motor vehicle.

This application is a continuation-in-part of the copending application of George H. Muller, Serial No. 486,498, filed February 7, 1955, now abandoned.

The present invention is directed to a motor vehicle wheel suspension incorporating a tubular type hydraulic shock absorber and telescopic control assembly in which an expansible fluid chamber is provided between the lower telescopic member and the sprung portion of the motor vehicle, with the expansible chamber being connected to a fluid power source to resiliently support the sprung structure of the vehicle. The cooperating telescopic members of the control assembly provide guiding means for the road wheel of the vehicle during its rising and falling movements relative to the sprung structure of the vehicle.

In one embodiment of the invention a generally vertical combined shock absorber and telescopic control assembly is connected at its upper end to sprung structure of the vehicle and at its lower end to one end of a suspension arm pivotally mounted upon the vehicle. The telescopic control assembly includes upper and lower cylinders connected to the sprung and unsprung structures respectively of the vehicle and incorporating therebetween a valve body having valve controlled passageways to perform a shock absorbing function, with the portion of the upper cylinder forming a fluid reservoir communicating with the valve passageways through the valve body. A fluid reservoir in the upper cylinder is placed in fluid communication with the smaller end of a remotely mounted two diameter cylinder and piston assembly. The opposite and larger end of the two diameter cylinder contains air or other inert gas compressed through a predetermined pressure under normal conditions, with a valve controlled pump and sump being provided to increase or decrease the pressure to change the normal riding height of the vehicle.

In another embodiment of the invention in which a pair of telescopically related cylinders are also utilized between the sprung and unsprung structures of the vehicle, a flexible rubber sleeve is provided between the upper end of the lower cylinder and a portion of the sprung structure of the vehicle to provide an expansible fluid chamber which is supplied with fluid pressure from a power source to resiliently support the sprung structure of the vehicle. Concentric cylinders are used to support the adjacent portions of the air sleeve during operation.

While the expansible fluid chamber associated with the telescopic control assembly of the wheel suspension in each modification may form the sole spring medium, spring means may also be used with the expansible fluid chamber to carry a portion of the load.

Other objects and advantages of this invention will be made more apparent as this description proceeds, particularly when considered in connection with the accompanying drawings, wherein:

Figure 1 is a fragmentary plan view of the forward portion of a motor vehicle chassis incorporating the suspension system of the present invention.

Figure 2 is a side elevational view of the construction shown in Figure 1.

Figure 3 is an enlarged vertical cross sectional view taken on the plane indicated by the line 3—3 of Figure 2.

Figure 4 is a fragmentary front elevational view of a modification.

Figure 5 is a fragmentary enlarged cross sectional view of the structure shown in Figure 4.

Figure 6 is a view similar to Figure 5, but showing a slight modification thereof.

Referring now to the drawings, and particularly to the modification shown in Figures 1–3 inclusive, the reference character 11 indicates generally the frame of a motor vehicle chassis having front road wheels 12. Inasmuch as the suspension system for each front road wheel 12 is identical, only one will be described in detail. A suspension member 13 of the trailing arm type is pivotally supported at its forward end upon a transversely extending horizontal pivot shaft 14 journaled in brackets 16 carried by a cross frame member 17 of the vehicle frame.

The trailing suspension arm 13 extends rearwardly in an upwardly inclined manner from its pivotal mounting 14, and is flared outwardly with respect to the vehicle frame. At its rearward end it is connected by means of a ball joint 18 to a spindle support 19 having a spindle portion 21 rotatably supporting the road wheel 12. The spindle support 19 as best seen in Figure 3, is formed with a socket 22 receiving and supporting the lower ends of inner and outer tubes 23 and 24 respectively of a combined hydraulic shock absorber and telescopic control member 25. Slidably received within the outer tube 24 is an upper tube 26 carrying at its lower end an annular piston 27 movable in the annular chamber between the inner and outer tubes 23 and 24 respectively.

The upper cylinder 26 is supported by means of a resilient mount 28 upon a frame bracket 29 mounted upon the side frame rail 31 of the frame 11 and projecting upwardly and outwardly therefrom. The rubber mount 28 provides sufficient flexibility to accommodate the angular movement of the combined hydraulic shock absorber and telescopic control member 25 necessarily resulting as the road wheel rises and falls.

A valve body 32 is carried by the upper end of the inner tube 23 and is slidable within the upper cylinder 26. The valve body 32 has passageways 33 and 34 therethrough controlled by control valves 36 and 37 respectively. The control valves 36 and 37 are more fully described in the copending application of John G. McQuaid and George H. Muller entitled "Shock Absorber," filed December 31, 1954, Serial No. 479,181, now Patent No. 2,815,099, dated December 3 1957, and having a common assignee with the present application.

Briefly, each of the valves 36 and 37 which are identical, has a valve disc 38 provided with a tapered port 39 therethrough controlled by a needle valve 41 which in turn is automatically adjusted by the expansible thermostatic element 42 to vary the effective opening of the port 39 and the valve disc 38. The valve disc 38 may also be raised from its seat against the action of coil spring 43 under extreme pressure or blow-off conditions.

The inner cylinder 23 is formed with an aperture 44 adjacent its lower end to provide communication between the inner cylinder 23 and the outer cylinder 24. The portion of the upper cylinder 26 above the valve body 32 forms a fluid reservoir 46 communicating with the annular chamber 47 beneath the valve body 32 and with the interior of the inner cylinder 23 through the control valves 36 and 37 respectively in the valve body.

The upper end of the upper cylinder 26 is closed by an end cap 48 suitably welded thereto and provided with an opening 49 in its upper wall receiving a fluid conduit 51. As best seen in Figures 1 and 2, the fluid conduit 51 is connected to the lower end of a two diameter cylinder indicated generally by the reference character 52.

The cylinder 52 is supported upon the vehicle frame 11 and comprises a lower small diameter cylinder 53 and an upper relatively large diameter cylinder 54. A piston 56 is reciprocable within the cylinder 53 and a piston 57 is reciprocable within the cylinder 54, the pistons 56 and 57 being interconnected by a piston rod 58. As best seen in Figure 2, the fluid conduit 51 is connected to the lower end of the small diameter cylinder 53. Thus, the lower portion of the cylinder 53 beneath the piston 56 is in constant fluid communication with the reservoir 46 in the upper portion of the combined shock absorber and telescopic control member 25.

The upper portion of the large diameter cylinder 54 above the piston 57 contains air under pressure which may be built up to a predetermined initial value.

From the foregoing it will be seen that rising and falling movements of the road wheel 12 react through the telescopic movement between the upper cylinder 26 and the valve body 32 to transfer fluid through the fluid conduit 51 between the reservoir 46 and the cylinder 52. Through the interconnected pistons 56 and 57 this fluid column is acted upon by the air pressure in the upper portion of the large cylinder 54. It will be noted that during wheel jounce the valve body 32 moves upwardly within the upper cylinder 26 to decrease the volume of the reservoir 46 and transfer fluid to the small diameter cylinder 53, moving the pistons 56 and 57 upwardly and increasing the pressure in the air chamber above the piston 57. Conversely, during rebound movement of the wheel the capacity of the reservoir 46 increases and the air pressure is decreased.

The lower end of the smaller cylinder 53 is also placed in communication with a hydraulic pump 61 by means of a conduit 62. A valve 63, which may be manually controlled, enables fluid to be supplied from the pump 61 to the lower cylinder 53 to increase the riding height of the vehicle to accommodate increased loads or to give greater road clearance. The valve 63 may also be operated to return fluid from the lower cylinder 53 to the reservoir 64 through the conduit 66 to lower the vehicle riding height. When no adjustment is being made pump output is bypassed to the reservoir through the conduit 66.

Referring now to the modification of the invention shown in Figures 4 and 5, the reference character 71 indicates a side frame rail of a motor vehicle. A transversely extending tubular cross frame member 72 is welded to the side frame rail 71 and pivotally supports a wishbone type suspension arm 73 for rotation about a pivot axis 74. At its outer end the suspension arm 73 is connected by means of a ball joint connection 76 to the lower end of a lower cylinder 77 forming part of a combined shock absorber and telescopic control unit 78. Telescopically received within the lower cylinder 77 is an upper cylinder 79. Bearings 81 are provided between the upper and lower cylinders 79 and 77 at their upper and lower ends. The upper end of the upper cylinder 79 is flexibly connected by means of a hollow resilient annulus 82 to a body panel 83, which may be part of a unitary frame and body structure, or which may be the body portion of a regular detachable frame construction. The front road wheel 84 is conventionally rotatably mounted upon a wheel spindle 86. The wheel spindle 86 is formed with an integral cylindrical portion 87 sleeved over the lower cylinder 77 and rigidly welded thereto. Thus it will be seen that steering movement of the road wheel 84 takes place about the axis of the telescopic control unit 78.

The upper and lower cylinders 79 and 77 may be internally provided with cooperating piston and valve structure to form a tubular type shock absorber in the manner of the modification shown in Figures 1 to 3 inclusive. The spring suspension for the unit is provided by means of an air sleeve 88 so mounted as to form an expansible air chamber between the lower cylinder 77, which is connected to the road wheel or unsprung structure of the vehicle, and the supporting body panel 83, which forms part of the sprung structure of the vehicle.

Cooperating with the air sleeve 88 and forming an expansible fluid chamber are concentric inner and outer cylinders 89 and 91 respectively. The inner cylinder 89 is formed at its upper end with a return bent flange 92 welded to the upper portion of the lower cylinder 77, and the adjacent end of the air sleeve 88 is formed with an enlarged bead 93 clamped against the upper portion of the inner cylinder 89 by a pair of nuts 94 threaded on the cylinder 77. It will be noted that the adjacent portion of the air sleeve 88 lies along the outer surface of the inner cylinder 89 to form a support therefor.

The outer cylinder 91 is of larger diameter than the inner cylinder 89 to form an annular space 96 therebetween. At its upper end the outer cylinder 91 is formed with a mounting flange 97 secured by means of bolts 98 to a plate 99 mounted upon the upper end cap 101 of the upper cylinder 79. The end cap 101 of the upper cylinder 79 is in turn rotatably connected by means of bearings 102 to the lower mounting plate 103 of the resilient mount 82 carried by the body panel 83.

The upper end of the air sleeve 88 is formed with a bead 104 clamped between the mounting flange 97 of the outer cylinder 91 and the plate 99 to form a seal therebetween. It will be noted that the adjacent portion of the air sleeve 88 lies along the inner surface of the outer cylinder 91 to form a support therefor as the lower cylinder 77 and the wheel carried thereby rise and fall during vehicle operation. It will be seen that the portions of the air sleeve 88 lying along each of the inner and outer cylinders 89 and 91 vary during wheel jounce and rebound.

Air or other fluid under pressure from a suitable supply source (not shown) is furnished to the expansible chamber formed by the air sleeve 88 through passageways 106 and 107 in the end cap 101 of the upper cylinder 79. The fluid under pressure thus forms a spring medium for the suspension unit, and the riding height of the vehicle may readily be varied or corrected by means of suitable controls.

Referring now to Figure 6, there is shown a slight modification of the structure shown in Figure 5, in that a supplemental coil spring 111 is provided between the plate 99 and a retaining plate 112 supported upon the upper end of the lower cylinder 77. With this construction the expansible fluid chamber and the coil spring cooperate to form the spring suspension for the vehicle wheel and prevents relative rotative motion between the inner and outer cylinders 89 and 91 respectively.

Although the various modifications of the invention are shown in conjunction with a front road wheel of a motor vehicle, the arrangement may of course be utilized in connection with a rear wheel as well.

It will be understood that the invention is not to be limited to the exact construction shown and described, but that various changes and modifications may be made without departing from the spirit and scope of the invention, as defined in the appended claims.

What is claimed is:

1. In a wheel suspension for a road wheel of a motor vehicle having a supporting structure and a wheel support upon which said wheel is mounted, upper and lower telescopically related cylinders connected to said supporting structure and said wheel support respectively, a suspension arm pivotally connected at one end to said supporting structure and at its opposite end to said lower cylinder, a power source, said suspension arm and said upper and lower cylinders guiding said road wheel during its rising and falling movements relative to said supporting structure, the upper end of said upper cylinder being closed by an end cap having a passageway therethrough connected to said power source, an outer cylinder surrounding said upper and lower cylinders and connected at its upper end to said supporting structure, a cylindrical resilient fluid bag within said outer cylinder adapted to freely engage the inner surface of said outer cylinder, the upper and lower ends of said cylindrical fluid bag being connected in sealed relationship with said outer and lower cylinders respectively to form an air tight chamber automatically expansible and retractable as said upper and lower cylinders move axially with respect to each other.

2. The structure defined by claim 1 which is further characterized in that the upper end of said resilient fluid bag is clamped between the upper end of said outer cylinder and the adjacent portion of said supporting structure so that a major portion of said fluid bag rests against the inner surface of said outer cylinder, and an inner cylinder intermediate said outer cylinder and said lower cylinder, said inner cylinder being secured at its upper end to the upper end of said lower cylinder, the opposite end of said fluid bag being connected to the upper end of said inner cylinder so that a portion of said fluid bag rests against the outer surface of said inner cylinder.

3. An independent wheel suspension for a motor vehicle having a supporting structure and a front steerable road wheel, comprising a spindle support rotatably supporting said road wheel, a suspension arm connected at one end to said supporting structure and at its opposite end to said spindle support, upper and lower telescopically related cylinders connected to said supporting structure and said spindle support respectively, said suspension arm and said upper and lower cylinders guiding said road wheel during its rising and falling movements relative to said supporting structure, a resilient fluid bag having its upper and lower ends connected in sealed relationship with said upper and lower cylinders respectively, a source of fluid pressure connected to said resilient fluid bag to resiliently support said supporting structure on said road wheel, and means rotatably connecting said upper cylinder to said supporting structure for relative rotation therebetween about the axis of said cylinder to permit steering movement of said road wheel.

4. The structure defined by claim 3 which is further characterized in that the upper end of said upper cylinder is closed by an end cap having a fluid passageway therein connected to said source of fluid pressure, said end cap extending beyond the upper end of said upper cylinder in proximity to said supporting structure, and said rotatable means comprises a bearing between said end cap and said supporting structure.

5. In a wheel suspension for a road wheel of a motor vehicle having a supporting structure and a wheel support upon which said wheel is mounted, upper and lower telescopically related cylinders connected to said supporting structure and said wheel support respectively, a suspension arm pivotally connected at one end to said supporting structure and at its opposite end to said lower cylinder, said suspension arm and said upper and lower cylinders guiding said road wheel during its rising and falling movements relative to said supporting structure, an expansible fluid chamber between said lower cylinder and said supporting structure forming the sole spring support for said road wheel, said expansible fluid chamber comprising a resilient sleeve having one end connected to the upper end of said lower cylinder and its opposite end connected to said supporting structure, a power source for applying pressure to the fluid in said expansible fluid chamber to resiliently support said supporting structure upon said road wheel, a coil spring mounted within said resilient sleeve with its opposite ends supported upon said supporting structure and the upper end of said lower cylinder respectively to supplement the spring support of said road wheel by said expansible fluid chamber.

6. An independent wheel suspension for a motor vehicle having a supporting structure and a front steerable road wheel, comprising a spindle support rotatably supporting said road wheel, a suspension arm connected at one end to said supporting structure and at its opposite end to said spindle support, upper and lower telescopically related cylinders connected to said supporting structure and said spindle support respectively, said suspension arm and said upper and lower cylinders guiding said road wheel during its rising and falling movements relative to said supporting structure, an outer cylinder surrounding said upper and lower cylinders and connected at its upper end to said upper cylinder, a resilient fluid bag within said outer cylinder adapted to freely engage the inner surface of said outer cylinder, the upper and lower ends of said cylindrical fluid bag being connected in sealed relationship with said outer and lower cylinders respectively to form an air tight chamber automatically expansible and contractible as said upper and lower cylinders move axially with respect to each other, a source of fluid pressure connected to said resilient fluid bag to resiliently support said supporting structure on said road wheel, and means rotatably connecting said upper cylinder to said supporting structure for relative rotation therebetween about the axis of said cylinder to permit steering movement of said road wheel.

References Cited in the file of this patent

UNITED STATES PATENTS

| | | |
|---|---|---|
| 1,133,337 | Tinkham | Mar. 30, 1915 |
| 1,486,911 | Messier | Mar. 18, 1924 |
| 2,490,719 | Tank | Dec. 6, 1949 |
| 2,537,491 | Thornhill | Jan. 9, 1951 |
| 2,624,592 | MacPherson | Jan. 6, 1953 |
| 2,735,691 | Carlson | Feb. 21, 1956 |